United States Patent [19]
Morotomi et al.

[11] Patent Number: 4,959,713
[45] Date of Patent: Sep. 25, 1990

[54] HOME AUTOMATION SYSTEM

[75] Inventors: Noriaki Morotomi; Yasumasa Endo; Yoshinori Emura; Nobuyoshi Asaka, all of Fujisawa; Hideki Inoue, Kamakura, all of Japan

[73] Assignee: Matsushita Electric Industrial Co, Ltd., Kadoma, Japan

[21] Appl. No.: 418,631

[22] Filed: Oct. 10, 1989

[51] Int. Cl.$^5$ .............................................. H04N 7/18
[52] U.S. Cl. ...................................... 358/108; 358/86; 358/194.1
[58] Field of Search ...................... 358/108, 194.1, 86; 379/90

[56] References Cited

U.S. PATENT DOCUMENTS

| | | | |
|---|---|---|---|
| 3,482,037 | 12/1969 | Brown | 358/108 |
| 4,370,675 | 1/1983 | Cohn | 358/108 |
| 4,509,073 | 4/1985 | Baran | 358/86 |
| 4,649,428 | 3/1987 | Jones | 358/194.1 |
| 4,665,544 | 5/1987 | Honda | 379/102 |
| 4,777,526 | 10/1988 | Saitoh | 358/108 |
| 4,896,349 | 1/1990 | Kubo | 379/90 |

FOREIGN PATENT DOCUMENTS

| | | |
|---|---|---|
| 63-278439 | 11/1988 | Japan . |
| 63-283334 | 11/1988 | Japan . |
| 63-287290 | 11/1988 | Japan . |
| 63-288536 | 11/1988 | Japan . |
| 63-288539 | 11/1988 | Japan . |
| 63-288594 | 11/1988 | Japan . |
| 63-288595 | 11/1988 | Japan . |
| 63-288596 | 11/1988 | Japan . |
| 63-290448 | 11/1988 | Japan . |
| 63-290490 | 11/1988 | Japan . |
| 63-290491 | 11/1988 | Japan . |
| 63-308436 | 12/1988 | Japan . |
| 63-308457 | 12/1988 | Japan . |
| 63-310337 | 12/1988 | Japan . |
| 63-314476 | 12/1988 | Japan . |

Primary Examiner—Howard W. Britton
Attorney, Agent, or Firm—Wenderoth, Lind & Ponack

[57] ABSTRACT

The present invention is directed to a home automation system, wherein a coaxial cable or other home bus path for data transmission is placed inside a home to connect an intercom unit and monitor camera, which comprise a hardware interface for communication with visitors, and a conventional home television to this bus, thereby to make it possible to output the audio and video signals from the intercom unit and monitor camera on a conventional broadcast reception television.

17 Claims, 9 Drawing Sheets

Fig. 9
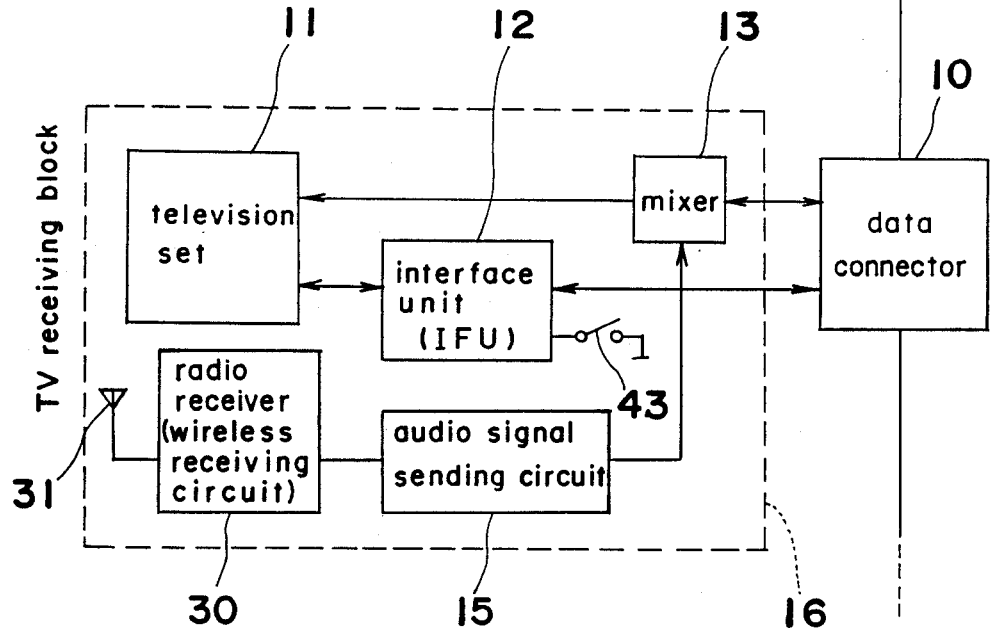
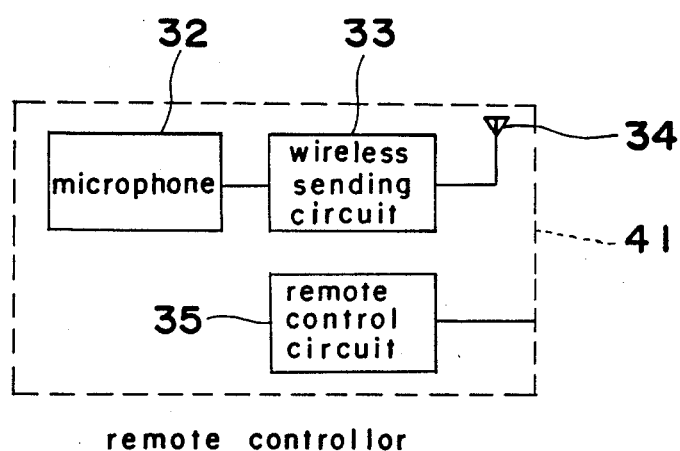
remote controller

Fig. 10
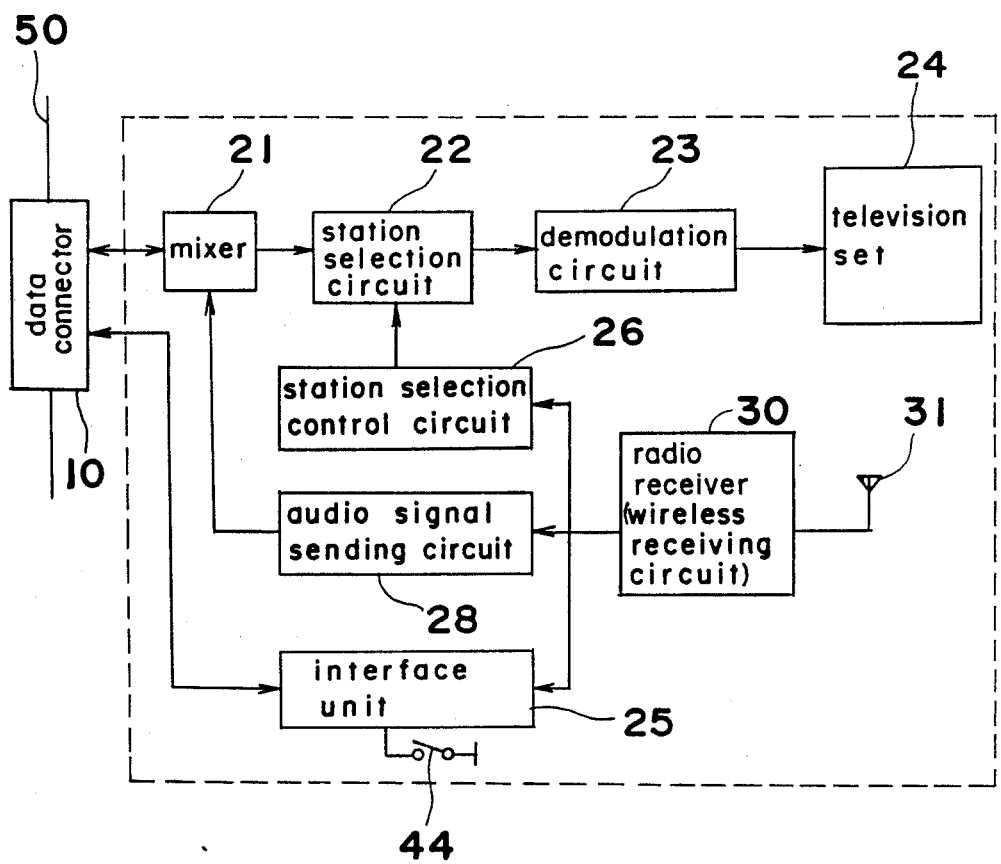
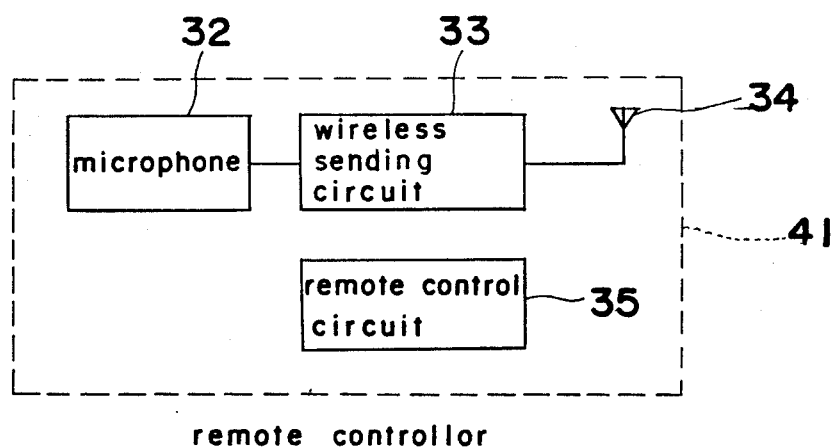
remote controller

HOME AUTOMATION SYSTEM

BACKGROUND OF THE INVENTION

The present invention relates to a data transmission system for an entrance intercom and security monitoring system in a home automation (HA) system using a data transfer bus inside the home.

Conventional entrance intercom and securitY systems are described below with reference to FIGS. 1-3.

In FIG. 1, the output of camera 51 installed in the entrance is connected to the input of inside unit 52 by a dedicated line. A TV modulator 53 is provided in inside unit 52 to modulate the camera output (television signal) for output to the specified television channel, channel 1 (CH1) or channel 2 (CH2). Either the broadcast signal from the antenna or the output signal from TV modulator 53 is then input to television set 55 via a switch (SW) 54.

With the construction shown in FIG. 1, the switch 54 is normally switched to the antenna so that normal television broadcasts can be viewed on the television set. When a call is received from either intercom 56 or 57, the user switches switch 54 to the TV modulator 53 side, resets the television set 55 channel selector to either CH1 or CH2 depending on the modulator connection, and is then able to view a visitor picked up by camera 51 on the screen of television set 55 while talking with the visitor through intercom 56, 57.

An alternative conventional system is shown in FIG. 2. This system differs from that shown in FIG. 1 in that the output signal of TV modulator 53 in inside unit 52a is converted to a signal on an unused channel in the UHF or VHF band and carried with the other TV signals from the antenna by a mixer 58.

With this system, the channel selector of television set 55 is set to a normal broadcast channel for program viewing. When a visitor comes, the user simply selects the preset UHF channel to monitor the output of camera 51. The systems in both FIG. 1 and FIG. 2 can also be used to constantly monitor the entrance even when a visitor is not present.

In FIG. 3 is shown a system using a two-way line 60 and a bidirectional branch junction 61. When a visitor comes, the detection signal output from a visitor detection circuit 62 is sent over the two-way line 60 through a modem 63 and a mixer 64, branched by a bidirectional branch junction 61 for relay to control a circuit 73 via a mixer 74 and a modem 72, thus notifying the occupant inside that a visitor has come to the entrance.

The signal output from the camera 66 and microphone 67 installed in the entrance is modulated to a specific television frequency by a television modulator 65. The modulated signal is output to the indoor side through the mixer 64 and two-way line 60, and input to a television demodulator 75 through a mixer 74 for demodulation of the video and audio signals. The video signal carries the image of the visitor taken by the monitor camera for playback on the dedicated monitor television 76, and the audio signal carries the voice of the visitor for reproduction via a speaker 71 in a handset 70.

Similarly, the audio from inside the room is converted to an audio signal by a microphone 77 also provided in the handset 70, modulated to a specific frequency by an audio transmission circuit 78, and input to the bidirectional branch junction 61 via the mixer 74. The signal is input by the two-way line 60 to the mixer 64 on the entrance side where it is received by an audio receiving circuit 68 and amplified through a speaker 69 so that the voice from the party inside can be heard by the visitor outside.

However, a conventional system configured as described above presents the following problems.

Specifically, with the system as shown in FIGS. 1 and 2, when the inside party learns via the intercom that a visitor has come, the inside party must reset the switch 54 and tune television set 55 to the proper channel if the visitor is to be viewed on the television. With the system as shown in FIG. 3, the dedicated monitor television 76 is required for viewing visitors; this dedicated monitor is incapable of receiving conventional television broadcasts, and if only one monitor television 76 is provided, the visitor can only be monitored in that single location where the monitor is installed. Monitoring the video from the entrance camera at multiple locations requires the installation of multiple monitor televisions 76, resulting in a corresponding increase in cost. In addition, this monitor television 76 must remain with the power normally on to monitor the visitors at the entrance.

The camera monitoring sub-system of a conventional home automation system is described below with reference to FIGS. 4 to 6.

FIG. 4 shows the configuration of a conventional camera monitoring system, wherein a reference numeral 80 is a monitor camera, 82 is a dedicated cable used to carry the image (video signal) from the monitor camera 80, and 81 is a monitor television which displays the image received from monitor camera 80. The operation of this camera monitoring system is described below. The image captured by monitor camera 80 is transferred over a cable 82 and displayed on the dedicated monitor television 81. With this system there is only one monitor camera 80, and a dedicated monitor television and cable are required.

FIG. 5 shows the configuration of a system using multiple monitor cameras, wherein a reference numerals 80a to 80c indicate the monitor cameras, 83 is a sequential switch used to control these multiple monitor cameras 80a-80c, and 81 is the monitor television used to view the image from the monitor camera selected by a sequential switch 83. Multiple monitor cameras can be connected in this system, but as in the system shown in FIG. 4, a dedicated monitor television and cable are required.

FIG. 6 shows a system which uses an existing, conventional television receiver and multiple monitor cameras configured so that the image from the monitor is displayed on the conventional television. In these FIGS. 80a-80c are monitor cameras, 82 is a dedicated cable used to carry the video signal from monitor cameras 80a-80c, 83a to 83c are modulators which convert the video image from monitor cameras 80a-80c to a specific broadcast signal wave, and 84 is a mixer which mixes the images from monitor cameras 80a-80c for relay to a television receiver 85. While this system makes it possible to use an existing television monitor, it is still necessary to tune the television to the channel used for monitoring camera signal reception, and dedicated cables are still needed.

SUMMARY OF THE INVENTION

The object of the present invention is to provide a data transmission system for an entrance surveillance which can receive signals from the monitor camera on a conventional television receiver and makes it easy to identify a visitor without requiring manual switch operation.

A further object of the present invention is to provide a home automation system which uses a remote control system for improved ease of use.

To achieve the aforementioned objectives, the system of the present invention is comprised of an entrance unit, one or multiple television receiver blocks, and a home bus. The entrance unit is comprised of a TV modulator which modulates the video signal from a TV camera and the audio signal from a microphone, an audio signal receiver which receives the audio signal transmitted over a home bus laid throughout the residence, a speaker to project the output signal from the audio signal receiver, an interface unit which communicates with other components in the system over the home bus to control said components, and a detection circuit which detects visitors. Each of the one or multiple television receiver blocks is comprised of a TV set with an external control terminal, an interface unit which is connected to the TV set and controls the TV set and communications between the TV set and other components via the home bus, a microphone, and an audio transmissions circuit which sends the output signal from the microphone over the home bus. The home bus connects the entrance unit with each of TV reception blocks. When the interface unit of the entrance unit detects a visitor at the entrance, it modulates the signals from the TV camera and microphone with the TV modulator and sends the modulated signal to the home bus together with a visitor detection signal. When the interface unit of the single or multiple TV receiver blocks receives the visitor detection signal, the tuner of the monitor television is automatically switched to receive the modulated TV signal output from the TV modulator in the entrance unit.

With a monitoring system constructed as described above, the party inside can be viewing normal television broadcasts and know simultaneously with the arrival of a visitor at the entrance that someone has come. A dedicated monitor for monitoring the entrance is not needed, and any television receiver connected at any point to the home bus can be used as an entrance monitor.

In addition, to achieve the other object of the present invention, the components connected to the home bus are comprised of a signal generator which generates a control signal controlled by a remote control device, a microphone, a signal transmitter which transmits the audio signal from the microphone, and an audio signal receiver.

With this configuration, the user is able to control the components of the system by remote control. Additionally, voice audio signals can be sent and received and music audio signals can be sent over the home bus, thereby improving the functionality of the home automation system.

To achieve the objects of the present invention, the system is also comprised of a home bus having multiple data connectors, one or multiple monitor cameras connected to the data connectors on the home bus, sensors which detect the entry of any object in the vicinity of the monitor camera(s), and a television receiver or video cassette recorder connected to a data connector on the home bus. On the basis of the detector signal from the sensor, the video signal from the monitor camera is automatically displayed on the television receiver or is automatically recorded to tape by the video cassette recorder.

In a system so configured, the image from the monitor camera is, for example, modulated to any open channel on the television receiver and the modulated signal is output to an existing television receiver or VCR connected to the home bus, thus improving the functionality of the home automation system.

BRIEF DESCRIPTION OF THE DRAWINGS

FIGS. 8 through 11 are block diagrams showing the modifications of television receiver blocks in the home automation system according to a second to fifth embodiments of the present invention, respectively, FIG. 13 is a block diagram showing the configuration of the camera interface unit for use in the home automation system according to a seventh embodiment of the present invention.

FIG. 14 is a block diagram showing the configuration of the interface unit to be employed in the home automation system according to a eighth embodiment of the present invention, FIG. 15 is a spectrogram used to describe the transmission of signals on the home bus to be employed in the home automation system, FIG. 16 and FIG. 17 are block diagrams showing the construction of the data connector to be employed in the home automation system, FIG. 18 is a waveform diagram of the data channel signal to be employed in the home automation system, and FIG. 19 is a circuit diagram of the signal driver to be employed in the home automation system.

DESCRIPTION OF PREFERRED EMBODIMENTS

A first embodiment of a home automation system according to the present invention is described herein below with reference to FIGS. 7 to 11.

Figure 1:
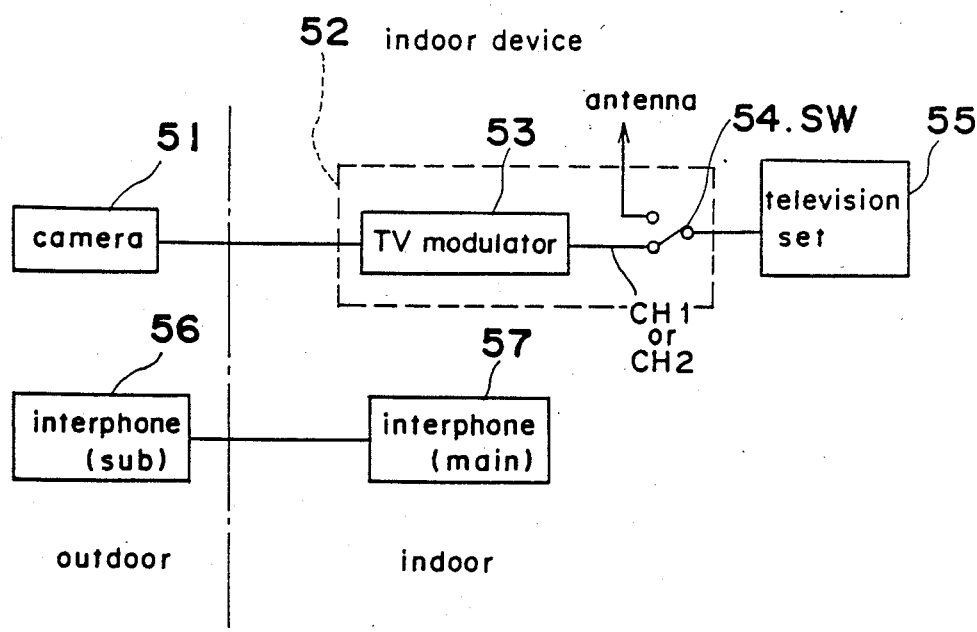
FIGS. 1 through 3 are block diagrams each showing the configuration of the entrance system in a conventional home automation system.
Figure 2:
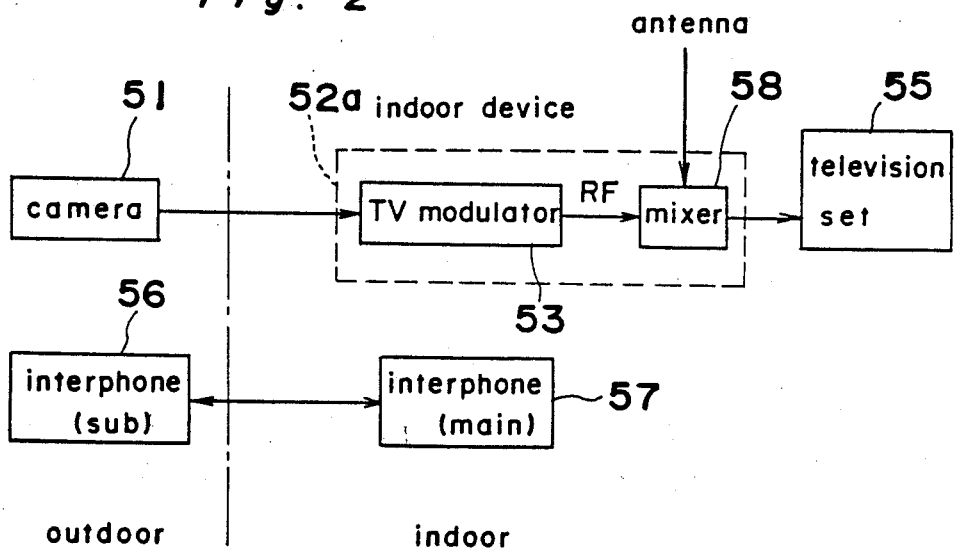
Figure 3:
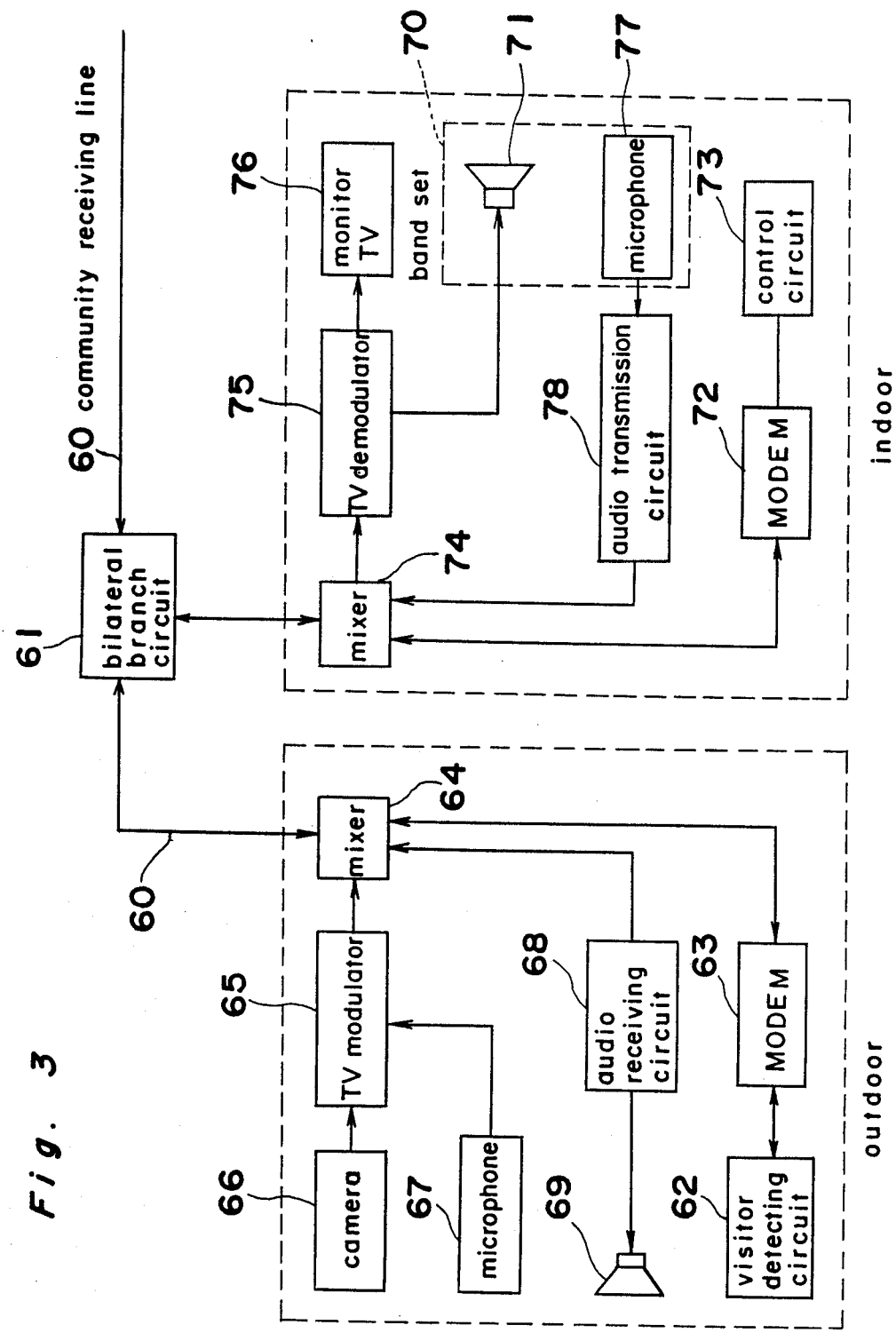
Figure 4:
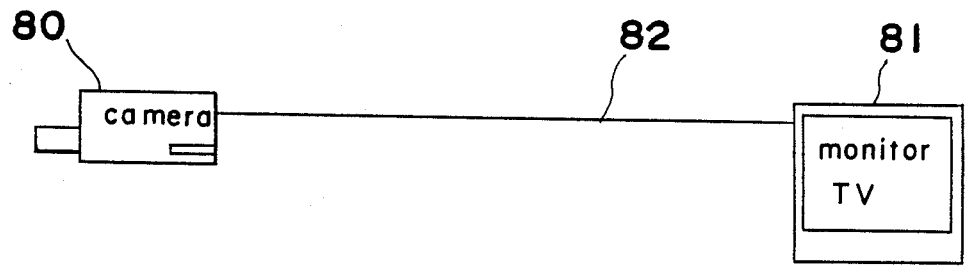
FIGS. 4 through 6 are block diagrams each showing the configuration of a conventional monitor camera system.
Figure 5:
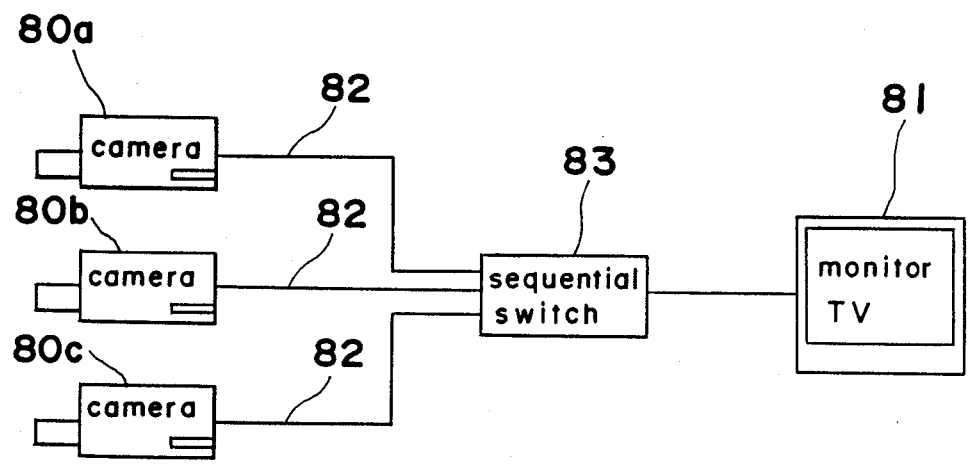
Figure 6:
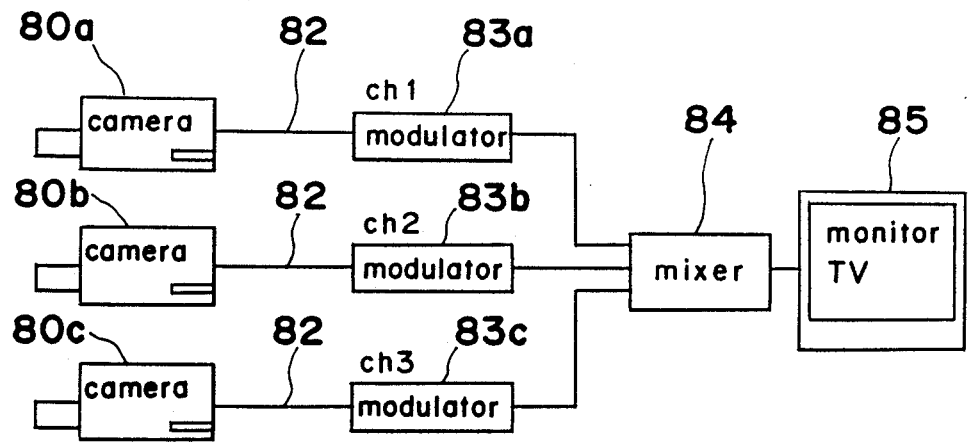
Figure 7:
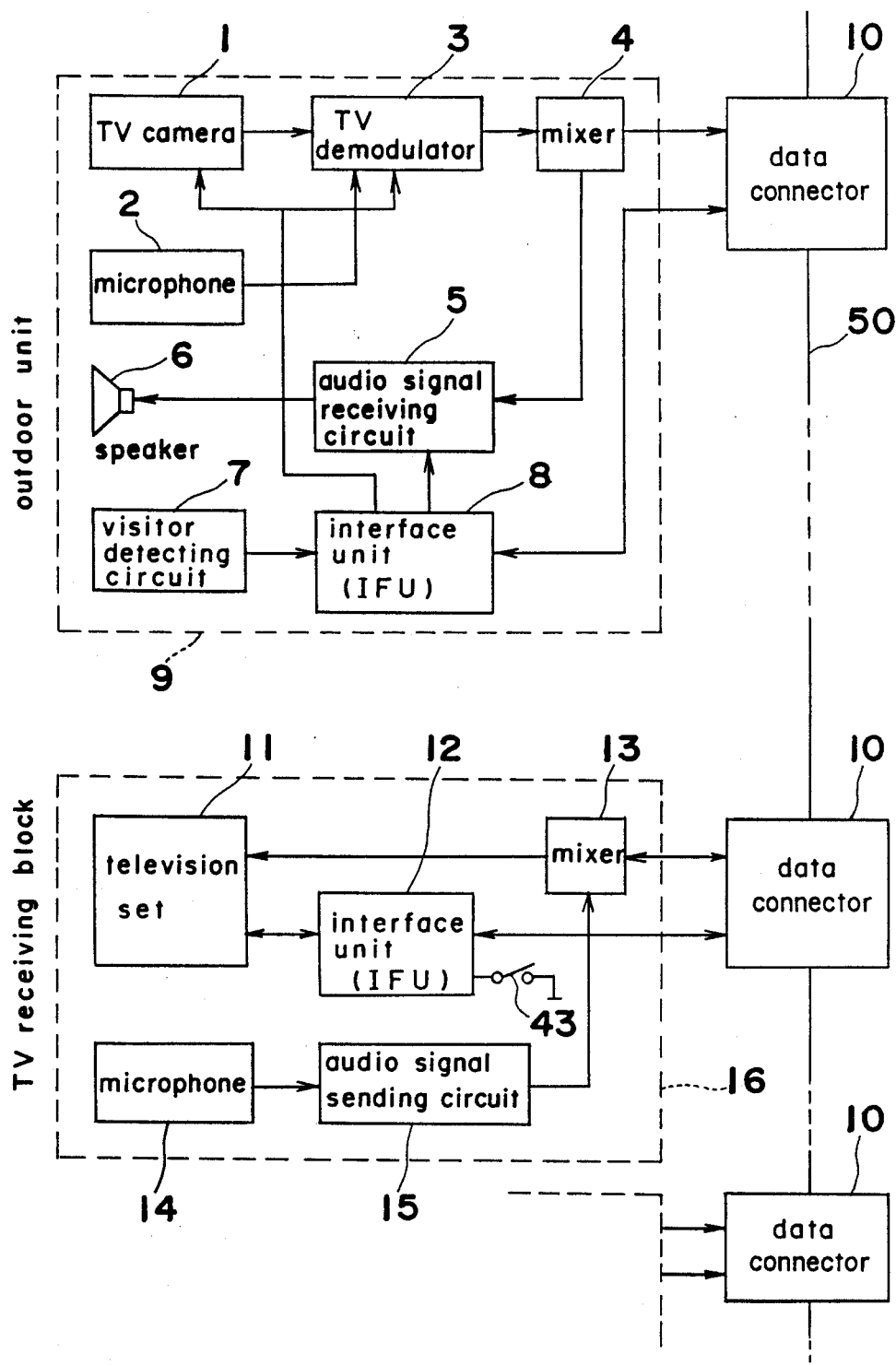
FIG. 7 is a block diagram showing the configuration of a home automation system according to a first embodiment of the present invention.

FIG. 7 is a block diagram showing the configuration of the indoor data transmission system according to a first embodiment of the present invention.

In FIG. 7 reference number 1 is a television camera installed at the entrance and used to photograph visitors; 2 is a microphone which captures the voices of visitors; 3 is a television modulator, hereinafter the TV modulator, S which modulates the video signal from the television camera 1 with the audio signal from the microphone 2; 4 is a mixer; 5 is an audio signal receiver which receives through the mixer 4 the audio signal transmitted over a home bus 50; 6 is a speaker used to amplify and project the voice of the visitor based on the signal output from audio signal receiver 5; 7 is a visitor detecting circuit which detects when the doorbell has been pressed and thereby detects the presence of a visitor; 8 is an interface unit (IFU) which handles via the home bus 50 communications with other components and external components connected to the home bus 50 and thus controls these other components; 9 is the entrance unit comprised of the components 1 through 8 described above, and is connected with the home bus 50 by means of data connector 10.

Reference number 16 is a television receiver block which is comprised of a television receiver 11 (TV set) having an external control terminal, a receiver IFU 12 which is connected to the TV set 11, controls TV set 11 and communicates with other system components on the home bus 50, a mixer 13, a condenser microphone 14, which may be provided, for example, in the living room or other room inside, an audio signal transmission circuit 15 which sends the output signal from the condenser microphone 14 over the home bus 50, and a switch 43 which switches between forced TV control and non-forced TV control modes. One or more TV receiver blocks 16 may be connected to the home bus 50 via data connectors 10 provided, for example, in each room of the house.

The operation of an indoor data transmission system comprised as described above according to the embodiment of the present invention is described below with reference to FIG. 7.

First, when the detection signal is generated by the visitor detector circuit 7, the IFU 8 of entrance unit 9 controls the TV modulator 3 to modulate the video signal from television camera 1 with the audio signal from microphone 2, and sends the modulated signal out over the home bus 50 with the visitor detection signal. When the receiver IFU 12 of each TV receiver block 16 connected to the home bus 50 receives the visitor detection signal sent from entrance unit 9, the tuner of the TV set 11 is automatically set to the channel used to receive the modulated signal output from the TV modulator 3 of entrance unit 9. As a result, the figure of the visitor is automatically displayed on the screen of TV set 11 as soon as the visitor is detected even if a conventional television broadcast is being watched at that time. If the TV set 11 is turned off at that time, the power can be turned on automatically when the unit is controlled by receiver IFU 12.

Note that if a visitor response signal is sent to the home bus 50 from the receiver IFU 12 of one of multiple TV receiver blocks 16 which are set automatically to the monitor channel to receive the visitor detection signal, the TV sets 11 in the other TV receiver blocks 16 from which a visitor response signal is not sent by the respective receiver IFU 12 can be reset to the same state as before the visitor detection signal is received to achieve a low power consumption system.

Thus, using a system configured as described above, the user can know immediately when a visitor has arrived without manually operating any controls even if the user is viewing another television program at that time. Furthermore, the entrance can be monitored from any place in the house where a TV receiver block 16 is located. Also, since a dedicated entrance monitor TV is not required and a conventional broadcast TV set 11 can be used, the system can be constructed more economically, and if a portable unit consisting only of the TV set is used, the TV set can be simply connected wherever a receiving block is located to provide an even more economical system.

Furthermore, because the TV receiver block 16 is comprised of a receiver IFU 12 connected to the home bus 50, the TV set 11 and other equipment, including, for example, lighting fixtures in the entrance to welcome visitors, can be controlled via the home bus 50.

The visitor response signal may be generated by means of a key operation whereby a keyboard switch is provided on the receiver IFU 12 in the TV receiver block 16 and the signal is generated when this key is pressed. Alternatively, an answer button may be provided on the TV set 11 itself, or a voice recognition device may be built in to the TV set 11 so that the response signal is generated and output to the receiver IFU 12 only when the pattern of a specific voice is received. The use of such a system would greatly minimize erroneous responses generated by noise or other sounds.

According to this first embodiment, when the power of the TV set 11 is off, the power will be turned on automatically when the visitor detection signal is received by the receiver IFU 12 so that the video from the monitor camera is displayed on the screen. A hierarchical order may also be assigned to the receiver IFUs 12 depending upon the positioning of the TV sets 11. This hierarchy can be used to specify which TV sets 11 are turned on when the visitor detection signal is first received, and which TV sets 11 are turned on only if the visitor response signal is not sent over the home bus 50 within a defined period of time thereafter. The system can also be configured to turn the power on to specific groups of TV sets or sequentially to each TV set at specific time intervals after the visitor detection signal is first received.

In the present embodiment, when the switch 43 is switched from the forced reception mode to the non-forced control mode, the arrival of a visitor can be signaled by operating a chime or other audible sound generator or by lighting or flashing a visible diode when the visitor detection signal is received by the receiver IFU 12 in the TV receiver block 16. Therefore, in the non-forced control mode, the TV set 11 is not automatically tuned to the monitor channel when the visitor detection signal is received, but the occupant can use a remote control device to send some response or to control the TV set 11 tuner to receive the modulated TV signal and monitor the visitor on screen.

With this construction, the occupant can prevent reception of normal television broadcasts from being interrupted whenever a visitor comes, and can also prevent the television from operating needlessly when a visitor comes while no one is at home.

Figure 8:
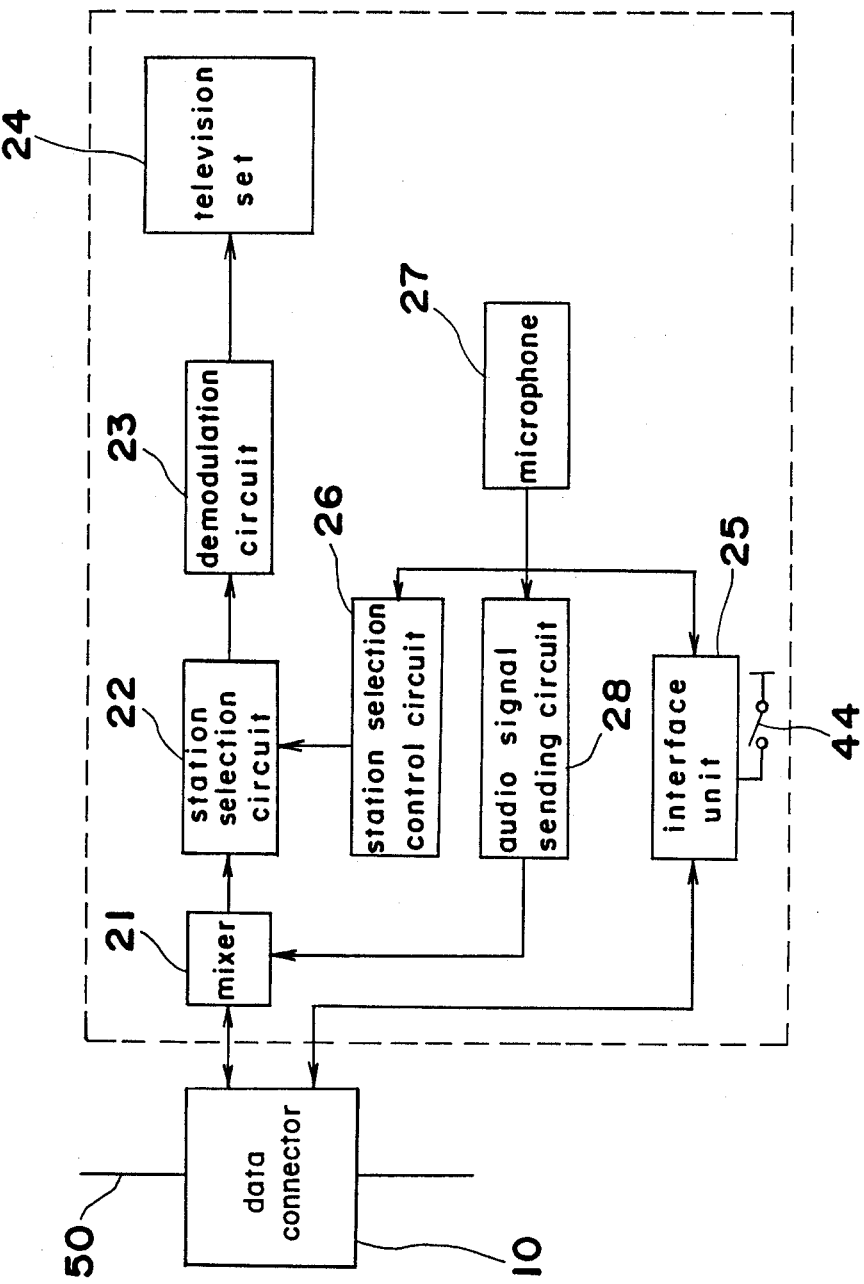

FIG. 8 is a block diagram showing a TV receiver block according to a second embodiment. This TV receiver block consists of an audio signal mixer 21, tuning circuit 22, demodulator 23 to demodulate the selected signal, TV set 24 to display the demodulated signal input to the TV set, tuner controller 26, which controls the channel selection of tuning circuit 22 according to the signal received from IFU 25, microphone 27, audio signal transmitter 28, which sends the audio signal over home bus 50 through data connector 10, and switch 44, which is used to select the forced or non-forced control mode.

In this second embodiment, the voice of a visitor picked up by microphone 2 is output from the speaker (not shown in the figure) of the TV set 24, but this system may also be configured with a speaker connected to IFU 25 so that the audio is output from the speaker 44 of this IFU 25.

FIG. 9 is a block diagram showing the configuration of a third embodiment of the TV receiver block. In this figure, reference numeral 30 represents the radio receiver (wireless receiving circuit), and 31 is the radio receiver antenna. In this embodiment, the circuits other than the TV receiver block 16 are identical to those shown in FIG. 7. In addition, 41 represents the remote control device, which is comprised of a microphone 32, radio transmitter 33, radio transmitter antenna 34, and remote control circuit 35. Note that remote control circuit 35 has the same configuration as the remote control circuit used in a remote control device for a common television receiver.

The difference in operation between the TV receiver block 16 of FIG. 7 and the TV receiver block of the present embodiment is that the operator speaks into the microphone 32 built in to the remote control device 41 to talk with a visitor at the entrance. The resulting voice signal is then transmitted from the remote control device 41 by the radio transmitter 33 and radio transmitter antenna 34. This transmitted signal is received by the radio receiver antenna 31 of TV receiver block 16, demodulated by the radio receiver 30, and then sent by the audio signal transmission circuit 15 over the home bus 50 to the entrance unit 9. This configuration enables the user to talk with the visitor in the entrance through the microphone 32 in the remote control device 41, reducing interference from ambient noise, and enabling a conversation with clearer, more well-defined sound.

The signal band used for common FM broadcasts or a signal band with an even higher frequency range is used for the output signal from the radio transmitter 33.

FIG. 10 is a block diagram showing the configuration of a fourth embodiment of the TV receiver block. In this embodiment, the microphone 27 shown in the TV receiver block 16 in FIG. 8 is configured as that shown in FIG. 9. Also, the radio receiver 30 and radio receiver antenna 31 are used to enable conversation through the remote control device 41.

Figure 11:
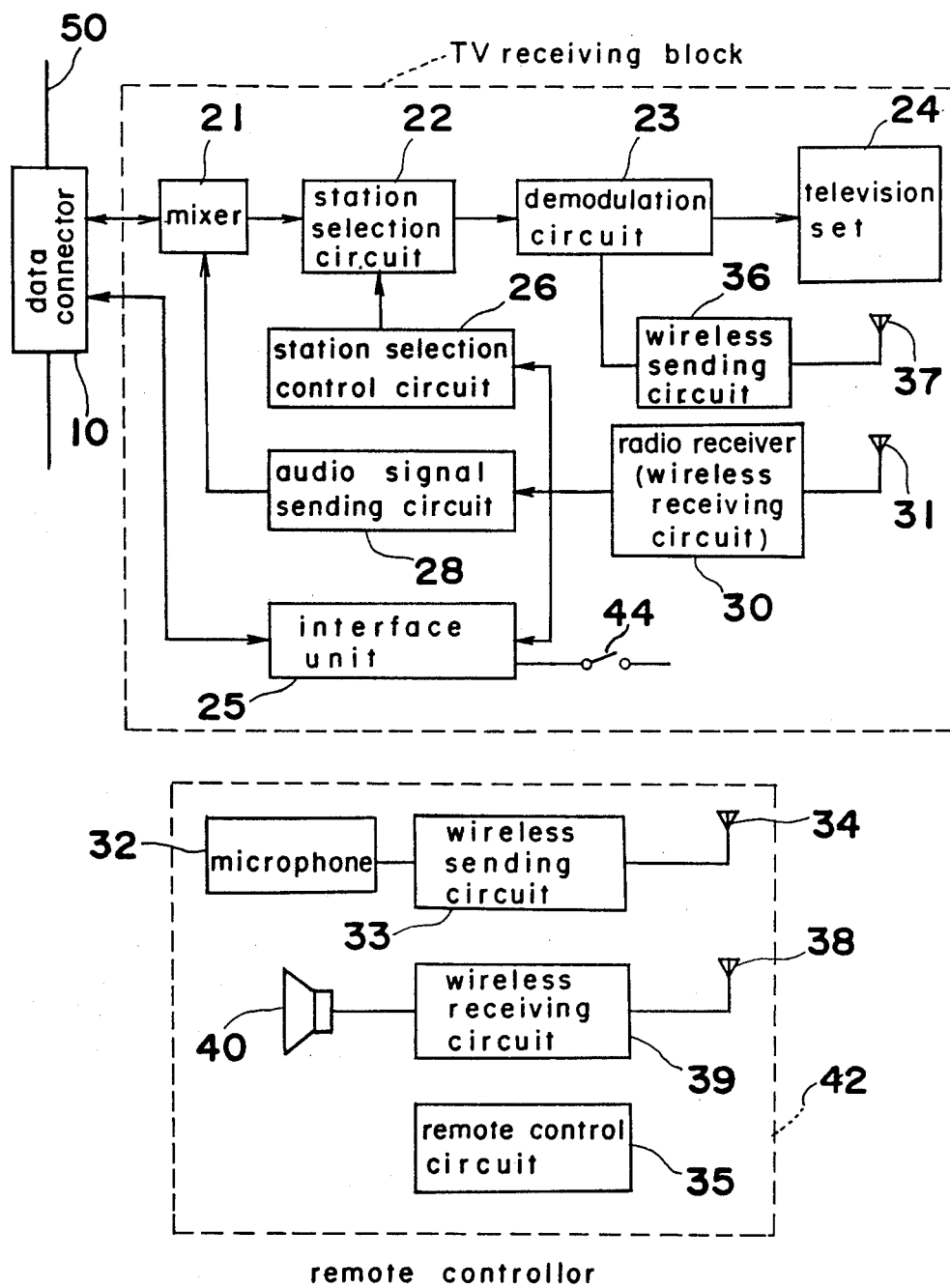

FIG. 11 is a block diagram showing the configuration of a fifth embodiment of the TV receiver block. In this embodiment, reference numeral 36 is a radio transmitter and 37 is the antenna for radio transmission; the other circuits comprising the TV receiver block 16 are configured as those shown in FIG. 10. A remote control device 42 is comprised of an antenna 38, radio receiver 39 and speaker 40; all other circuits in the remote control device 42 are comprised as those in remote control device 41 shown in FIG. 10.

The difference between the operation of the device shown in FIG. 11 with that shown in FIG. 10 is that the voice of the visitor demodulated by demodulator 23 is transmitted by the radio transmitter 36 and antenna 37; this signal is then received by the antenna 38 in remote control device 42, demodulated by the radio receiver 39, and projected by the speaker 40. With this configuration, the operator can both speak with and hear the voice of the visitor at the entrance through the microphone 32 and the speaker 40 in the remote control device 42, thus making conversation between the visitor and occupant even clearer.

In this embodiment, the radio receiver antenna 31 and antenna 37 can also be a shared common antenna, as can be a radio transmitter antenna 34 and antenna 38.

Figure 12:
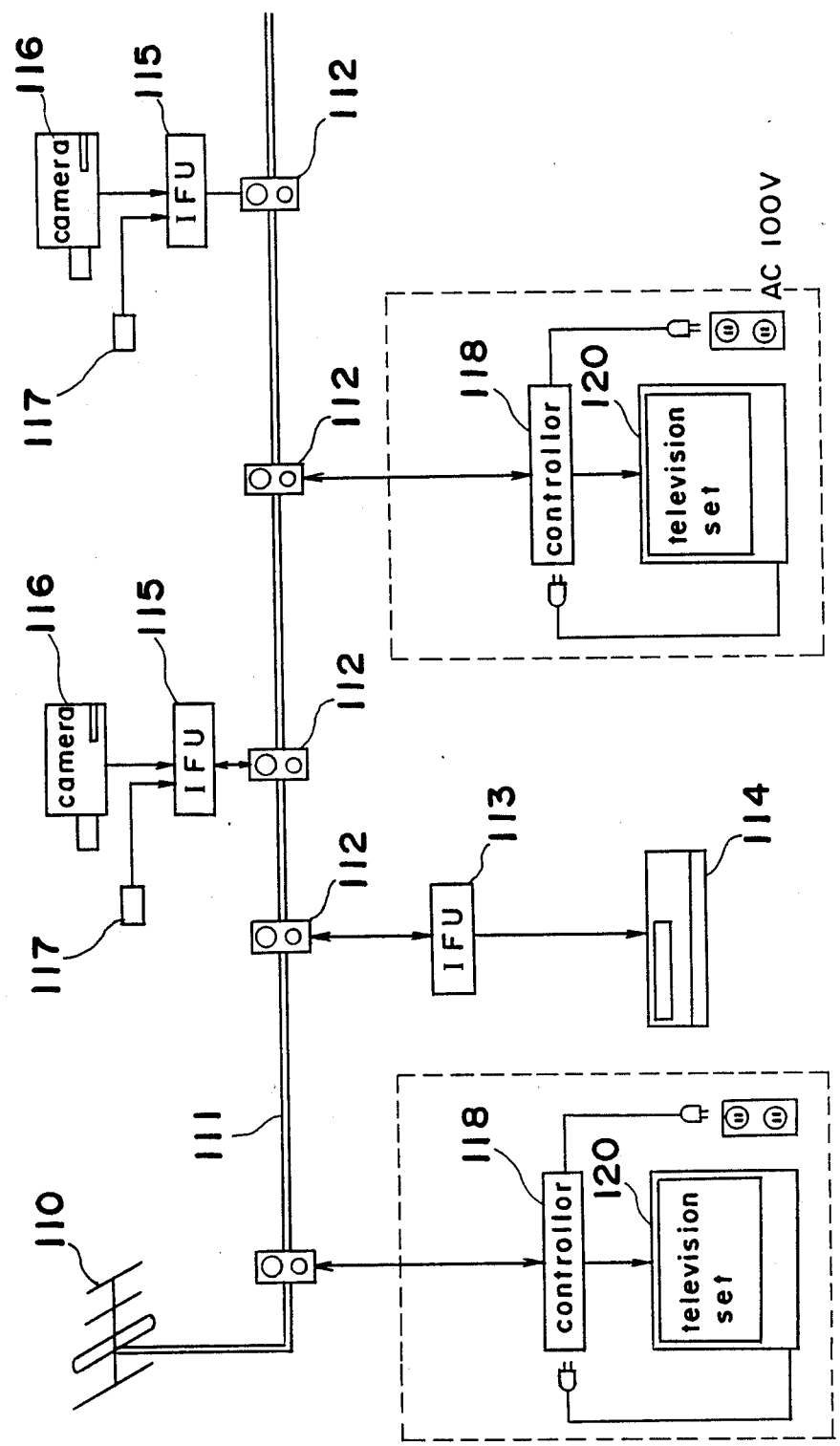
FIG. 12 is a block diagram showing the configuration of a home automation system according to a sixth embodiment of the present invention.

A further alternative, sixth embodiment of the present invention is described below with reference to FIG. 12, which is a diagram showing a home automation system incorporating the present invention. In FIG. 12, reference numeral 110 is the antenna for television, FM, and other broadcast signal reception; 111 is a home bus comprised of coaxial cable or other cable; 112 is the data connector used to connect system components to the home bus 111 for data transmission and extraction; 113 is a video cassette recorder (VCR); 114 is the VCR interface unit used to control the VCR 113; 115 is the camera interface unit used to control a monitor camera 116 is connected to data connector 112 through the camera interface unit 115; 117 is a sensor located near the entrance or windows to detect intruders; 118 is a controller used to control a television set 120, which is a conventional television used to receive video signals for viewing on the screen, and is connected to the data connector 112 through controller 118.

The operation of the home automation system thus configured in the present embodiment is described below.

The television signal received by antenna 110 is normally carried along the home bus 111 through the data connectors 112 to any television set 120 connected to the home bus 111. When the sensor 117 detects entry by any unauthorized party, a detection signal output from sensor 117 is applied to the camera interface unit 115, and a signal indicating that sensor 117 is triggered is output from camera interface unit 115 to the controller 118 over the home bus 111. If the controller 118 is set to the monitor mode, the controller 118 sends an operation request signal across the home bus 111 to the camera interface unit 115 at which the intruder is detected, and a recording request signal to the VCR interface unit 113 to set the VCR 114 to record. So that monitor camera 116 and VCR 114 are controlled together, the controller 118 controls the power on/off and channel selection of television set 120, and displays the video (signal) from the monitor camera 116, which has been modulated by the camera interface unit 115 and sent over the home bus 111 through data connector 112, on the screen of television set 120. In other words, the operation of television set 120 is controlled by the controller 118; the signal transferred over the home bus 111 at the channel selected by controller 118 is demodulated to a video signal, or an RGB signal is extracted, and the demodulated signal is shown on the screen of the television set 120. Turning the television set 120 power on and off is controlled by the controller 118. The power cord for the television set 120 is connected to the power output of the controller 118, and power is supplied by the controller 118.

The above operation is applied in the automatic camera recording mode in a security system to detect unauthorized intruders. When multiple cameras are each independently operated, a single controller 118 can be used to control each monitor camera. Each camera is assigned a specific address, and the controller 118 operates the specific camera through the assigned address. To make this addressing function possible, when each monitor camera 116 is connected to the home bus 111, a data signal identifying the connection is sent from the camera interface unit 115 over the home bus 111 to the controller 118; when the controller 118 receives this signal, a monitor camera address is registered with the controller 118. As a result, by sequentially and automatically operating individual monitor cameras 116 connected to the home bus 111 on a continuous, time-sharing basis, the video image from each of the monitor cameras 116 can be sequentially projected on the screen of the television set 120.

The camera interface unit of seventh embodiment of the present invention is shown in FIG. 13, wherein the camera interface unit 115 is comprised of a television demodulator 130 which demodulates the video signal output of monitor camera 116 to a television signal, and an interface unit 131 which is used to communicate with other components in the system through data connector 112.

FIG. 14 is a block diagram showing eighth embodiment of the interface unit 131, wherein reference numeral 140 is a control circuit and 141 is a signal drive circuit used to communicate over the home bus 111. The control circuit 140 uses the signal drive circuit 141 for two-way communications with other components connected to the home bus 111. It notifies other components when the sensor 117 is triggered, turns television demodulator 130 on, and sends the video signal from monitor camera 116 over the home bus 111.

FIG. 15 is a spectrogram used to explain signal transmission over the home bus 111.

Because the home bus 111 is a coaxial cable, it can be used to carry signals across a frequency band ranging continuously from the direct current level to frequencies in the 1-GHz range. In the present embodiment, frequencies from DC current to a maximum 10 MHz are used for the data channel; frequencies greater than 10 MHz are used as the RF channel. The interface unit in each component uses the data channel for communications. The communications signal is an AMI (alternate mark inversion) signal with a 50% duty cycle transmitting data at 9600 bps. The RF channel carries existing radio broadcast frequencies, FM broadcasts, television broadcasts (including VHF-L, VHF-H, UHF, and satellite), and includes a frequency band which is used as a data channel over the home bus only. The video signal for the monitor camera 116 in this embodiment uses an open signal range in the UHF broadcast frequency band.

FIG. 16 and FIG. 17 show the construction of the data connector 112.

In FIG. 16, reference numeral 200 is a high pass filter which passes the RF channel signal, 210 is a low pass filter which passes the data channel signal, and 220 is an attenuator.

The coaxial path of the home bus 111 is connected to the home bus output and the home bus input. The outputs of the television demodulator 130 and the interface unit 131 in FIG. 13 are connected respectively to the RF terminal and the data terminal.

The RF signal in the home bus 111 is separated by high pass filter 200. The attenuator 220 electrically reduces the connection between the components connected to the RF terminal and the home bus 111 to prevent unwanted interference with other components connected to the home bus 111. The characteristics of the attenuator 220 are set to produce an insertion loss of from 10 dB to 15 dB.

The data channel signal is separated by the low pass filter 210, and sent to the interface unit of the other components through the data terminal.

FIG. 17 shows another modification of the data connector 112, wherein the home bus input and home bus output are connected as described. To the RF terminal through which is carried the RF channel signal are connected a high pass filter comprised of capacitors C1, C2, and a coil L1, and a resistor R1 and a coil L2. The value of resistor R1 is determined by the number of RF terminal connections to the home bus 111. A resistor R2 is used to unify the impedance from the RF terminals to 75 ohms.

The data channel signal is supplied from the data terminal using a low pass filter comprised of coils L10 and L11, and capacitor C11.

The waveform of the data signal in the data connector 112 is shown in FIG. 18. FIG. 18(a) shows the signal in the home bus; it is an AMI signal with an amplitude of approximately 2.5 V in both the positive and negative directions. The duty ratio of the signal is approximately 50% and the high frequency of the signal is suppressed by the control signal. It has a negative logic. The signal in FIG. 18(b) is the reception signal of the interface unit.

An alternative modification of the signal drive circuit 141 is shown in FIG. 19, in which T20 is a transformer with a turn ratio of 1:1:1; D20, D21 are protector diodes; Q20, Q21 are drive transistors; R20 to 23 are base current limiting resistors for transistors Q20, Q21; IC30, IC31 are comparators for reception signal waveform rectification; R30 to R33 are voltage differentiation resistors for the input signal; R34, R35 are comparator voltage generator resistors for IC30, IC31.

In FIG. 18(a), when the signal is output to the positive side, the transistor Q20 becomes on; when the signal is output to the negative side, the transistor Q21 becomes on. When an excessively high signal enters into the transformer T20, diodes D20, D21 function to prevent a reverse voltage greater than a predefined level from being applied between the emitter and collector of transistors Q20 and Q21, and thus prevents damage to the transistors Q20 and Q21.

Resistors R30 to R33 have a common resistance of a minimum 10 kilohms. If the resistance is greater than 10 kilohms, the resistance passes the transformer T20 and becomes a load resistance on the data channel of the home bus. The object is the minimize the effect on other components.

The output signal waveforms from comparator IC30 and IC31 when the signal in FIG. 18 (a) is input from the home bus is as shown in FIG. 18 (b).

Using the embodiments of the present invention as described above, because the TV set is automatically tuned to the channel required to receive the TV modulated signal output from the TV modulator of in the entrance unit when the interface unit in the TV receiver block receives the visitor detection signal, the user will know immediately upon arrival that a visitor has come without manually operating any switches or controls even if another, conventional television broadcast is being viewed at that time. Furthermore, because the TV receiver block is connected via the home bus, the arrival of a visitor can be known at any point in the home where there is a home bus connection with a television set connected. Moreover, because the TV sets are controlled through the interface unit, each interface unit can independently control the TV set or other system component connected to the interface unit according to the response of the visitor.

In addition, by providing a forced TV control/non-forced TV control mode selector switch on the interface unit of the TV receiver block, it becomes possible to select from two major notification modes when a visitor is detected: a controlled mode in which the television channel selector is automatically switched to the monitor channel, the power is turned on for the television if it is off, and the video image from the entrance camera is automatically shown on the TV screen, and a non-controlled mode in which a chime or alarm is sounded, or an LED or other indicator is turned on to light steady or flash.

By also providing a microphone and radio transmitter in the remote control device used to control the television or system and a radio receiving circuit to receive the signal from the remote control in the TV receiver block, the user may converse with the visitor at the entrance via the remote control device from any point in the house.

According to the present invention, sensors used to detect unauthorized intruders can also automatically turn monitor cameras on so that images of the intruder can be automatically displayed on the screen of any existing television or recorded to a video cassette recorder connected to the system bus. Multiple cameras can also h=independently controlled to automatically capture a sequential series of images. In addition, by simply connecting existing television, VCRs, or other components to the home bus through the data connectors, multiple television sets and multiple monitor cameras can be used. Also, the use of a home bus provides a system which can be easily expanded with greater functionality in the future.

What is claimed is:

1. A home automation system which reproduces on a television receiver in a TV receiver block inside the residence the voices from a voice collection circuit and the video images from a telephone camera provided in an entrance unit, and which comprises the entrance unit and the TV receiver block being connected with the entrance unit via a home bus laid throughout the residence in this system, said entrance unit including a TV modulator which modulates the video signal from a TV camera and the audio signal from a voice collection circuit, an audio signal receiver which receives the audio signal transmitted over the home bus, a speaker to project the output signal from the audio signal receiver, an interface unit which communicates with other components in the system over the home bus to control said components, and a detection circuit which detects visitors; and said television receiver block including a TV set with an external control terminal, an interface unit which is connected to the TV set and controls the TV set and communications between the TV set and other components via the home bus, a voice collection circuit, and an audio transmissions circuit which sends the output signal from the voice collection circuit over the home bus.

2. A home automation system according to claim 1, wherein a video cassette recorder with an interface unit to communicate with the home bus is connected to the home bus so that when a visitor detection signal sent by the entrance unit over the home bus is received by a video cassette recorder, the TV modulated signal sent from the entrance unit is automatically received and recorded to tape.

3. A home automation system according to claim 1 wherein when the interface unit of the entrance unit detects a visitor at the entrance, it modulates the signals from the TV camera and voice collection circuit with the TV modulator and sends the modulated signal to the home bus together with a visitor detection signal; and when the interface unit of the TV receiver block receives the visitor detection signal, the tuner of the monitor television is automatically switched to receive the modulated TV signal output from the TV modulator in the entrance unit.

4. A home automation system according to claim 2, wherein the TV receiver block comprises a selector switch for switching between a forced and a non-forced control mode.

5. A home automation system according to claim 1 or 3, wherein there are a plurality of the TV receiver blocks and, when a visitor response signal is sent to the home bus from the receiver IFU of one of the TV receiver blocks which are set automatically to the monitor channel to receive the visitor detection signal from the entrance unit, the TV sets in the other TV receiver blocks from which a visitor response signal is not sent by the respective receiver IFU is rendered to reset to the same state as before the visitor detection signal is received.

6. A home automation system according to claim 1, wherein the TV receiver block comprises a tuning circuit, a TV demodulation circuit, tuner control circuit, an interface unit for communication with the home bus, a voice collection circuit, an audio transmission circuit, and a television set.

7. A home automation system according to claim 6, wherein the voice collection circuit comprises a microphone provided in the TV receiver block.

8. A home automation system according to claim 6, wherein the voice collection circuit is comprised a microphone and a radio transmission circuit which transmits the signal from a microphone built in to the remote control device used to control the channel selection and other functions of the TV receiver block, and a radio receiver circuit which receives and demodulates the signal from said radio transmission circuit.

9. A home automation system according to claim 8, wherein the TV receiver block comprises a radio transmission circuit which transmits the voice signal demodulated by the TV demodulation circuit, and the remote control device is comprised a radio receiver circuit which receives and demodulates the signal from said TV receiver block radio transmission circuit, and an amplification circuit which projects said demodulated signal.

10. A remote control device for use in a home automation system, which reproduces on a television receiver in a TV receiver block inside the residence the voices from a microphone and the video images from a television camera provided in an entrance unit, and which comprises the entrance unit and the TV receiver block being connected with the entrance unit via a home bus laid throughout the residence, comprising a remote control means for controlling other system components, and a communication means for communicating with visitors who have come to the entrance.

11. A remote control device according to claim 10, wherein the communication means is comprised of a microphone and a radio transmission circuit for transmitting an audio signal.

12. A remote control device according to claim 10, wherein the communication means is comprised of a microphone and a radio transmitter for transmitting an audio signal, a radio receiver for receiving an audio signal, and a speaker for projecting the received audio signal.

13. A remote control device according to claim 11 or 12, wherein the radio transmitter uses an FM modulation method.

14. A remote control device according to claim 12, wherein the radio receiver uses an FM modulation method.

15. An entrance unit of in an audio-visual entrance for use in a home automation system, which reproduces on a television receiver in a TV receiver block inside the residence the voices from a microphone and the video images from a television camera provided in an entrance unit, and which comprises the entrance unit and the TV receiver block being connected with the entrance unit via a home bus laid throughout the residence, by comprising a controller connected to the home bus, to modulate the signal from the TV camera at a predefined time interval using a TV modulator and to send the modulated signal to the home bus.

16. An entrance unit according to claim 15, wherein said entrance unit comprises a sensor which detects the entrance of any object within a given range, when the entrance of some object or person is detected, the TV camera is operated, the signal from the TV camera is modulated by a TV modulator and the modulated signal is sent over the home bus, and the video signal from the TV camera is automatically displayed by any of one or multiple TV receiver blocks connected to the home bus.

17. An entrance unit according to claim 16, wherein a video cassette recorder with an interface unit to communicate with the home bus is connected to the home bus so that when the entrance of some object or person is detected by the sensor, the TV camera is operated, the signal from the TV camera is modulated by a TV modulator and the modulated signal is sent over the home bus, the video signal from the TV camera is automatically recorded by said video cassette recorder equipped with an interface unit.

* * * * *